US011080745B2

(12) United States Patent
Sinha et al.

(10) Patent No.: US 11,080,745 B2
(45) Date of Patent: Aug. 3, 2021

(54) FORECASTING POTENTIAL AUDIENCE SIZE AND UNDUPLICATED AUDIENCE SIZE

(71) Applicant: Adobe Inc., San Jose, CA (US)

(72) Inventors: Ritwik Sinha, Bangalore (IN); Kushal Chawla, Delhi (IN); Yash Shrivastava, West Bengal (IN); Dhruv Singal, New Delhi (IN); Atanu Ranjan Sinha, Bangalore (IN); Deepak Pai, Santa Clara, CA (US)

(73) Assignee: ADOBE INC., San Jose, CA (US)

( * ) Notice: Subject to any disclaimer, the term of this patent is extended or adjusted under 35 U.S.C. 154(b) by 1007 days.

(21) Appl. No.: 15/435,869

(22) Filed: Feb. 17, 2017

(65) Prior Publication Data

US 2018/0240149 A1 Aug. 23, 2018

(51) Int. Cl.
G06Q 30/02 (2012.01)
(52) U.S. Cl.
CPC ..... *G06Q 30/0251* (2013.01); *G06Q 30/0201* (2013.01)
(58) Field of Classification Search
USPC ................................. 705/7.11–7.42
See application file for complete search history.

(56) References Cited

U.S. PATENT DOCUMENTS

| 9,996,956 | B1 * | 6/2018 | Gracie | .................. G06T 11/206 |
| 2011/0173126 | A1 * | 7/2011 | Knapp | .................. G06Q 30/02 |
| | | | | 705/71 |
| 2011/0231242 | A1 * | 9/2011 | Dilling | ............... G06Q 30/0277 |
| | | | | 705/14.42 |
| 2012/0310729 | A1 * | 12/2012 | Dalto | .................... G06Q 30/02 |
| | | | | 705/14.43 |
| 2014/0375650 | A1 * | 12/2014 | Grundstrom | ........... G16H 10/20 |
| | | | | 345/440 |
| 2016/0180401 | A1 * | 6/2016 | Ray | ....................... G06Q 50/01 |
| | | | | 705/14.42 |

(Continued)

OTHER PUBLICATIONS

Anonymous, "comScore Announces Availability of Media Planning Tool Leveraging Behavioral Insights into Online Usage Habits of Doctors", PR Newswire, New York, Apr. 27, 2011 (Year: 2011).*

(Continued)

*Primary Examiner* — Amber A Misiaszek
(74) *Attorney, Agent, or Firm* — F. Chau & Associates, LLC

(57) ABSTRACT

Forecasting a potential audience size and an unduplicated audience size for a digital campaign includes receiving an audience segment input and a time period input. The audience segment input is converted into multiple atomic target specifications. For each of the multiple atomic target specifications, a potential audience size is determined during the time period input by selecting a time series model based on a frequency of attribute values from the atomic target specification and combining the selected time series model with a frequent item set model. The potential audience size for each of atomic target specifications is aggregated over the time period input into a total potential audience size. The total potential audience size is output. The time series model and the frequent item set model are obtained using data from a historic bid request database.

14 Claims, 9 Drawing Sheets

(56) References Cited

U.S. PATENT DOCUMENTS

2017/0103417 A1 4/2017 Nguyen et al.
2017/0127110 A1* 5/2017 Chaar ............... H04N 21/2547

OTHER PUBLICATIONS

"Inventory Discovery overview", retrieved from https://support.google.com/adxbuyer/answer/4643021?hl=en, downloaded on Feb. 15, 2017, 2 pages.
"View reach estimates for the Display Network", retrieved from https://support.google.com/adwords/answer/2475441?hl=en, downloaded on Feb. 15, 2017, 3 pages.
"Turn—Platform", retrieved from https://www.turn.com/platform#products, downloaded on Feb. 15, 2017, 7 pages.
Adikari, et al., "Real time bidding in online digital advertisement", International Conference on Design Science Research in Information Systems. Springer International Publishing, 2015, pp. 19-38.
Agrawal, et al., "Fast Algorithms for Mining Association Rules", in Proc. 20th Int. Conf. Very Large Data Bases, VLDB, vol. 1215, 1994, pp. 487-499.
Chickering, et al., "Targeted Advertising with Inventory Management", EC'00, Oct. 17-20, 2000, Minneapolis, Minnesota, 5 pages.
Curcio, "Sketch of the Day: HyperLogLog—Cornerstone of a Big Data Infrastructure", downloaded from https://research.neustar.biz/2012/10/25/sketch-of-the-day-hyperloglog-cornerstone-of-a-big-data-infrastructure/, Oct. 25, 2012, 5 pages.
Do, et al., "Mining Frequent Itemsets with Category-Based Constraints", in International Conference on Discovery Science, 2003, pp. 76-86.
Flajolet, et al., "HyperLogLog: the analysis of a near-optimal cardinality estimation algorithm", 2007 Conference on Analysis of Algorithms, AofA 07, DMTCS proc. AH, 2007, pp. 137-156.
Gensch, "Computer Models in Advertising Media Selection", Journal of Marketing Research, vol. 5, No. 4 (Nov. 1968), pp. 414-424.
Ghosh, et al., "Adaptive Bidding for Display Advertising", WWW 2009, Apr. 20-24, 2009, Madrid, Spain, 10 pages.
Hyndman, et al., "Automatic Time Series Forecasting: The forecast Package for R", Journal of Statistical Software, vol. 27, Issue 3, Jul. 2008, pp. 1-22.
Kwerel, "Information Retrieval for Media Planning", Management Science, vol. 15, No. 4, Application Series (Dec. 1968), pp. B137-B160.
Lee, et al., "Real Time Bid Optimization with Smooth Budget Delivery in Online Advertising", ADKDD'13, Aug. 11, 2013, Chicago, Illinois, U.S.A, 9 pages.
Cui, et al., "Bid Landscape Forecasting in Online Ad Exchange Marketplace", KDD'11, Aug. 21-24, 2011, San Diego, California, USA. 9 pages.

* cited by examiner

500

```
Range estimate for a given target segment and campaign period
Input: Campaign time period τ and target audience segment T
 1: procedure BID REQUEST ESTIMATE(T, τ)
 2:     Convert T into the form T ≡ T_1 ∨ T_2 ∨ ··· ∨ T_N, where each T_n represents
        an atomic target segment definition, i.e. any attribute in each T_n has a
        unique value (or the value ANY)
 3:     for each T_n do
 4:         (A_1, A_2, ..., A_I) ← T_n, where A_i is the (unique) value of the ith
        attribute for T_n                                      ▷ In our case, I = 7
 5:         FEASIBLE ← ∅
 6:         for each A_i do
 7:             if A_i ∉ TIME1 then    ▷ Checking A_i ∈ TIME1 is checking
        whether there is a model for A_i in TIME1
 8:                 continue
 9:             else
10:                 FEASIBLE = FEASIBLE ∪ A_i
11:             end if
12:         end for
13:         for each day t in τ do
14:             ⟨MAX_n^t, MIN_n^t⟩ ← ATOMIC ESTIMATE(FEASIBLE, T_n, t)
15:         end for
16:     end for
17:     for each day t in τ do
18:         MAX^t = ∑_n MAX_n^t                    ▷ maximum value for day t
19:         MIN^t = ∑_n MIN_n^t                    ▷ minimum value for day t
20:     end for
21: end procedure
Output: The (daily level) range of number of bid requests in the time period
        τ from the audience segment T, with γ% confidence
```

Range estimate for an atomic target segment and given campaign period
1: procedure ATOMIC ESTIMATE(FEASIBLE, $T_n, t$)
2:    if FEASIBLE $= \emptyset$ then
3:       if $T_n \in FIS$ then
4:          MAX $\leftarrow$ {Maximum prediction of TIME2 (within the $\gamma\%$ confidence range) for day $t$} $\times$ { (Number of bid requests for $T_n$ from $FIS$) / (Total number of bid requests for the training period) }
5:          MIN $\leftarrow$ {Minimum prediction of TIME2 (within the $\gamma\%$ confidence range) for day $t$} $\times$ { (Number of bid requests for $T_n$ from $FIS$) / (Total number of bid requests for the training period) }
6:       else
7:          MAX $\leftarrow$ {Maximum prediction of TIME2 (within the $\gamma\%$ confidence range) for day $t$} $\times$ { (Threshold value for $FIS$) / (Total number of bid requests for the training period) }
8:          MIN $\leftarrow$ 0
9:       end if
10:    else
11:       $A^* \leftarrow$ Element of FEASIBLE with lowest number of bid requests (in $FIS$)
12:       if $T_n \in FIS$ then
13:          MAX $\leftarrow$ {Maximum prediction of $A^*$'s model in TIME1 (within the $\gamma\%$ confidence range) for day $t$} $\times$ { (Number of bid requests for $T_n$ from $FIS$) / (Number of bid requests for $A^*$ from $FIS$) }
14:          MIN $\leftarrow$ {Minimum prediction of $A^*$'s model in TIME1 (within the $\gamma\%$ confidence range) for day $t$} $\times$ { (Number of bid requests for $T_n$ from $FIS$) / (Number of bid requests for $A^*$ from $FIS$) }
15:       else
16:          MAX $\leftarrow$ {Maximum prediction of $A^*$'s model in TIME1 (within the $\gamma\%$ confidence range) for day $t$} $\times$ { (Threshold value for $FIS$) / (Number of bid requests for $A^*$ from $FIS$) }
17:          MIN $\leftarrow$ 0
18:       end if
19:    end if
20:    return $\langle$MAX, MIN$\rangle$
21: end procedure

```
1:  procedure PRISMCC(δ,n,B)              ▷ (min. threshold, no. of attr., dataset)
2:
3:      k = 1                              ▷ First pass of the algorithm
4:
5:      for all β ∈ B do                   ▷ β = (a_1, a_2, ..., a_n)
6:          for i ← 1, n do
7:              a'_i = (ANY, ..., ANY, a_i, ANY, ..., ANY)   ▷ n-1 times ANY
8:              P^1_i[a'_i] = P^1_i[a'_i] + 1               ▷ increment frequency of a'_i in P^1_i
9:          end for
10:     end for
11:
12:     P^1 = {P^1_1, P^1_2, ..., P^1_n}   ▷ Candidate itemsets for pass 1
13:
14:     for i ← 1, n do
15:         for all (I, f) ∈ P^1_i do
16:             if f ≥ δ then              ▷ Is the itemset frequent?
17:                 Q^1_i[I] = f
18:             end if
19:         end for
20:     end for
21:
22:     Q^1 = {Q^1_1, Q^1_2, ..., Q^1_n}   ▷ Frequent itemsets for pass 1
23:
24:
25:     k = 2                              ▷ iterative step for k = 2 to n
26:
27:     while ∃Q ∈ Q^{k-1} s.t. Q.length ≠ 0 and k ≤ n do
28:
29:         P^k = GEN(n, k, Q^{k-1})       ▷ Generate candidate itemsets for pass k
30:
31:         for i ← 1, (n choose k) do
32:             for all (I, f) ∈ P^k_i do
33:                 if f ≥ δ then          ▷ Is the itemset frequent?
34:                     Q^k_i[I] = f
35:                 end if
36:             end for
37:         end for
38:
39:         Q^k = {Q^k_1, Q^k_2, ..., Q^k_n}   ▷ Frequent itemsets for pass k
40:
41:         k = k + 1
42:
43:     end while
44:
45:     return (Q^1, Q^2, ..., Q^n)        ▷ return all the frequent itemsets
46:
47: end procedure
```

```
 1: procedure GEN(n,k,Q^{k-1})        ▷ (no. of attributes, pass number, previous
        frequent itemsets)
 2:
 3:     l = COMBLIST(n,k)              ▷ Generate combinations list
 4:
 5:     for i ← 1, (n k) do
 6:         (a,b) = l[i]
 7:         for all x ∈ Q_a^{k-1}, y ∈ Q_b^{k-1} do
 8:             if x & y have exactly k − 2 values(except ANY) same then
 9:                 z ← Combine x & y to get (k − 2) + 2 = k elements not equal
        to ANY and rest as ANY
10:                 P_i^k[z] = P_i^k[z] + 1
11:             end if
12:         end for
13:     end for
14:
15:     P^k = {P_1^k, P_2^k, ..., P_{(n k)}^k}    ▷ Candidate itemsets for pass 1
16:
17:     return P^k
18:
19: end procedure
```

```
1:  procedure COMBLIST(n,k)              ▷ (no. of attributes, pass number)
2:
3:      l = []
4:
5:      α ← enumerate over all combinations of length k
6:      β ← enumerate over all combinations of length k-1
7:
8:      for i ← 1, $\binom{n}{k}$ do
9:
10:         a ← index of $\alpha_{1,k-1}[i]$ in β      ▷ Use first k-1 elements of $\alpha[i]$
11:
12:         b ← index of $\alpha_{2,k}[i]$ in β        ▷ Use last k-1 elements of $\alpha[i]$
13:
14:         l[i] = (a, b)
15:     end for
16:
17:     return l
18:
19: end procedure
```

FIG. 9

FORECASTING POTENTIAL AUDIENCE SIZE AND UNDUPLICATED AUDIENCE SIZE

TECHNICAL FIELD

This description relates to data modeling.

BACKGROUND

A demand side platform (DSP) enables a campaign manager to manage digital campaigns and interact with multiple different digital campaign exchanges on behalf of the campaign manager. A common issue faced in a digital campaign is determining the target audience size as well as determining the unduplicated audience size for a specific target segment. Through targeting, specific content and/or specific types of content may be delivered to a particular audience. Through targeting, campaign managers strive to make sure to service the appropriate audience and to provide relevant information for ease of user browsing and for a better overall user experience. Both campaign managers and end users benefit from delivery of more robust, intelligent and better suited information while providing the better user experience in an efficient manner without wasting resources.

The issue is challenging because the campaign manager has to make these determinations for all possible target segments in a given digital campaign period, which can lead to a lack of certainty. A higher uncertainty may result in a lack of confidence and a budget misallocation for the digital campaign. Existing forecasting techniques may not be efficient and use more computational resources when attempting to make these determinations. Thus, campaign managers desire a tool to forecast the potential audience size and unduplicated audience size in an accurate and computationally efficient manner for a given digital campaign.

SUMMARY

This document describes systems and techniques to forecast potential audience size and unduplicated audience size. This document also describes systems and techniques to mine a dataset to obtain a frequent item set model. According to one general aspect, forecasting a potential audience size and an unduplicated audience size for a digital campaign includes receiving an audience segment input and a time period input. The audience segment input is converted into multiple atomic target specifications. For each of the multiple atomic target specifications, a potential audience size is determined during the time period input by selecting a time series model based on a frequency of attribute values from the atomic target specification and combining the selected time series model with a frequent item set model. The potential audience size for each of atomic target specifications is aggregated over the time period input into a total potential audience size. The total potential audience size is output. The time series model and the frequent item set model are obtained using data from a historic bid request database.

In another aspect, the frequent item set model is obtained by mining data from a historic bid request database. A model creator module is configured to receive as input a minimum threshold, a number of attributes in a transaction and a dataset containing multiple transactions. The model creator module creates an initial candidate item set containing only one item each and applies the minimum threshold to the initial candidate set to create a first frequent item set. Then, the model creator module iteratively creates candidate item sets and frequent item sets starting the iteration with the first frequent item set and applying the minimum threshold during each iteration for each item set up to the total number of attributes. For item sets that do not meet the minimum threshold, the model creator module also eliminates subsets of these item sets. The model creator module outputs a set of frequent item sets that satisfy the minimum threshold and a frequency of the frequent item sets.

The details of one or more implementations are set forth in the accompanying drawings and the description below. Other features will be apparent from the description and drawings, and from the claims.

BRIEF DESCRIPTION OF THE DRAWINGS

FIG. 5 is example pseudocode for the example flowchart of FIG. 3.

FIG. 6 is example pseudocode for the example flowchart of FIG. 4.

FIG. 7 is example pseudocode to mine a dataset to obtain a frequent item set model.

FIG. 8 is example pseudocode for a subroutine of the pseudocode of FIG. 7.

FIG. 9 is example pseudocode for a subroutine of the pseudocode of FIG. 7.

DETAILED DESCRIPTION

Figure 1:
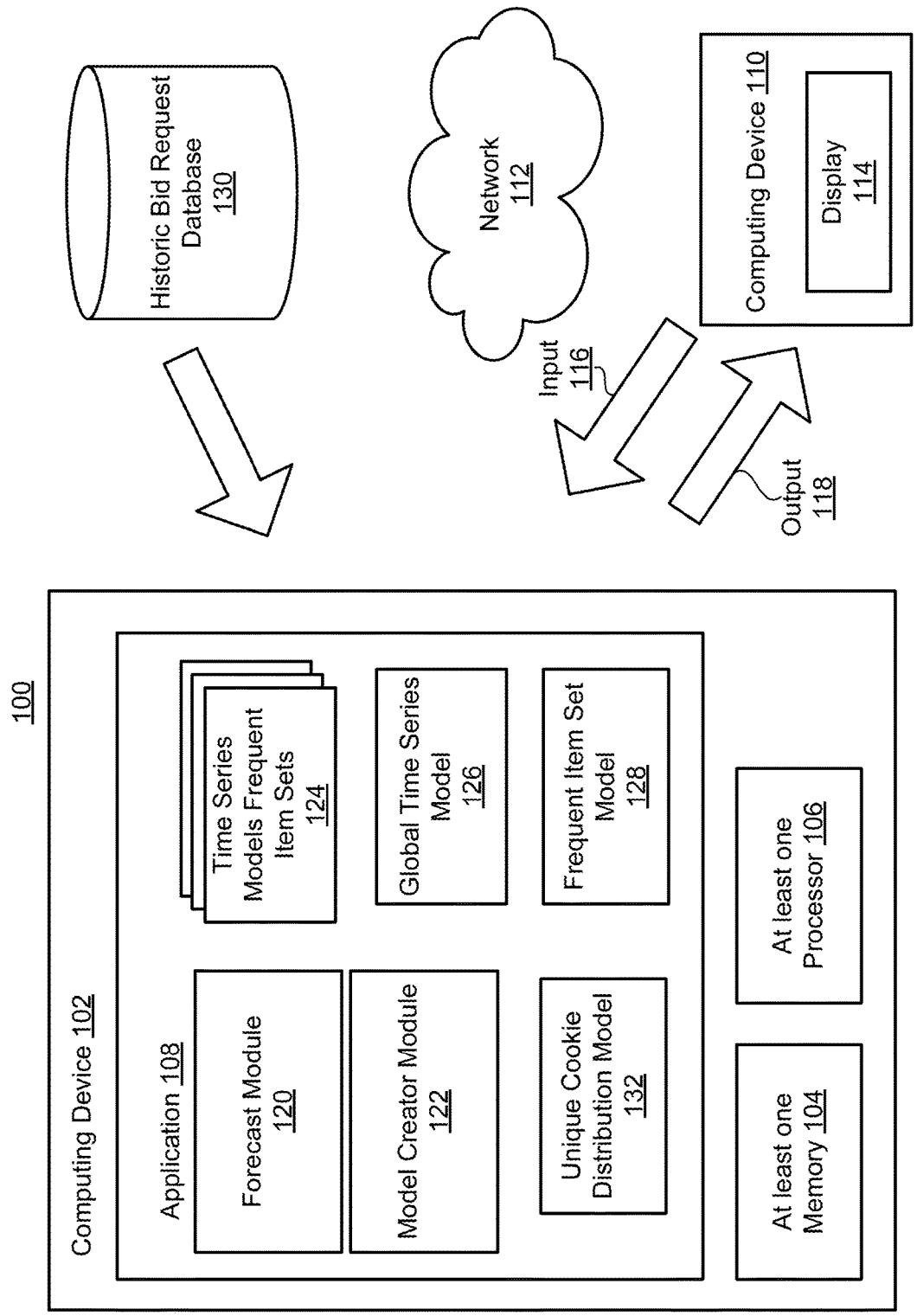
FIG. 1 is an example block diagram of a system for forecasting potential audience size and unduplicated audience size.

This document describes systems and techniques for data modeling for forecasting potential audience size and unduplicated audience size. Such systems and techniques can enable a campaign manager to accurately determine the potential audience size and unduplicated audience size for a desired digital campaign over a campaign time period using a demand side platform (DSP). The systems and techniques advantageously enable the accurate determination because they provide for faster and more efficient modeling and mining of historic data, where the historic data is extremely large in volume, and without which the number of permutations of data combinations may be impossible to consider in any practical and meaningful application. That is, the systems and techniques achieve fast reporting of desired information using data from the historic dataset taking into account the complex online ecosystem without using computational resources proportional to the size of the whole dataset or to the whole attribute space. With an accurate determination of the potential audience size and unduplicated audience size, the campaign manager can allocate appropriate resources for the digital campaign. This document also describes systems and techniques to mine frequent item sets from historic data, where the frequent item sets are used in determining the potential audience size and unduplicated audience size.

In one implementation, the desired digital campaign may be a display ad campaign that is conducted by the DSP by bidding in real-time auctions across multiple display ad exchanges. In one implementation, a campaign manager may be interested in the audience size estimation at an individual ad exchange level, which is difficult to determine using data from a historic dataset without using an impractical and unfeasible amount of computational resources proportional to the whole dataset or the whole attribute space. To determine the potential audience size for a desired digital campaign, the campaign manager provides as input an audience segment and a time period. The potential audience size is defined as the number of viewers who belong to the audience segment, where the audience segment input is indicative of a segment of audience targeted or desired to be targeted. In other terms, the potential audience size is equivalent to the estimated number of bid requests from the audience segment in the given campaign period. The time period input is indicative of the period of time for a desired digital campaign. The campaign manager defines the audience segment (or target audience) in terms of one or more attributes. In the context of a display ad campaign, the defined target audience attributes may include country, region, browser, device, category, visibility and ad slot dimensions. Each attribute may have one or more possible values to select from a list of potential values. The DSP may provide multiple options from a list of choices for each of these attributes. This is difficult for traditional systems and techniques to handle because of the size and complexity of the whole dataset or the whole attribute space.

In addition to forecasting the potential audience size, it is also desirable to forecast the unduplicated audience size. The unduplicated audience size refers to the unique count of cookies belonging to a certain target audience segment. In other words, the count of cookies with the potential for at least one exposure/impression is the unduplicated audience size.

To predict the number of bid requests, which as mentioned above is also equivalent to the potential audience size, coming from a particular target segment, a historic value of the number of bid requests coming from that target segment may be utilized. One technical problem faced with determining the potential audience size and the unduplicated audience size using the historic number of bid request from the target segment is that the total number of possible item sets is enormous. Here, an item set refers to a possible combination of the attribute values. For example, the values of India, Google Chrome and mobile together specify an item set in which the unspecified attributes (e.g., region, category, visibility, ad slot dimension) can take any value. For a day of historic data, it has been observed that there are 2 distinct ad slot positions, 3 distinct device types, 101 distinct browsers, 182 distinct ad slot dimensions, 236 distinct countries, 1494 distinct webpage categories and 2339 distinct regions. Thus, the enormous size of the item sets creates processing and efficiency complexities in determining the potential audience size and unduplicated audience size. The processing and efficiency complexities are amplified in a high speed environment.

Other technical challenges faced with determining the potential audience size and the unduplicated audience size include modeling the temporal variation of the number of bid requests coming from a particular target segment. Because the attribute space is so huge, it becomes infeasible to have time series models for each of the possible combinations of attribute values. Further technical challenges are presented when attempting to estimate the unduplicated audience count, which as mentioned above is the count of unique cookies, due to processing and efficiency complexities that are presented due to the large attribute space.

The system and techniques discussed herein solve these technical challenges and other technical challenges. In some implementations, the techniques include forecasting the potential audience size using a combination of a time series model and a frequent item set model for a target audience segment and a digital campaign time period. Both the time series model and the frequent item set model are derived from a historic bid request database. The time series model used to forecast the potential audience size is selected from a suite of time series models that have been trained using the historic bid request database. The frequent item set model is obtained by mining the historic bid request database and applying categorical constraint processing to arrive at all frequent attribute combinations, in an efficient processing manner. The manner used to obtain the frequent item set model generates sparser candidate sets and leads to a more efficient algorithm to produce the frequent item set model.

In this manner, the technical solution includes a two-phase workflow using time series forecasting and frequent item set mining. In the first phase, a relevant time series model is selected either from a suite of time series models available in order to obtain a forecast of the size of a broader, but related, audience segment or a global time series model is used. The relevant time series model is selected by comparing the relative statistical importance of the attribute values for the target specification using historic data from the historic bid request database. The time series model is trained on selected attribute values, which are statistically most important in the historic data.

In the second phase, the frequent item set model is obtained from the historic bid request database by applying categorical constraint processing. The frequent item set model is then used to compute a relative frequency ratio measure for the target specification. This computed ratio is then used to estimate the number of bid requests coming from the target audience segment as a proportion of the selected time series model in phase one. In this manner, one selected time series model is used in combination with the frequent item set model.

This two-phase approach of combining a time series model and a frequent item set model to predict the potential audience size enables making predictions with high accuracy for a large collection of target audiences. The technical solution enables the audience size to be accurately estimated even if the target audience is defined using an arbitrary number of AND and OR clauses, as compared to other approaches. Furthermore, the techniques enable translating the potential audience size to an unduplicated audience size using a unique cookie distribution adjustment.

By leveraging the historical bid request data to predict the potential audience size, campaign managers for a digital ad campaign are provided with a preview of the audience size estimate to enable them to accurately budget and plan for the digital campaign. This type of forecasting tool is useful not only for new customers planning a digital ad campaign for the first time, but this forecasting tool is useful for existing customers who may want to reposition and reallocate funds for a digital ad campaign. While some of the examples used herein are related to digital ad campaigns, the techniques and systems described herein may be used to solve technical problems in other contexts where the use of time series models and frequent item set models is applicable.

FIG. 1 is a block diagram of a system 100 for forecasting potential audience size and unduplicated audience size. The system 100 also may be used for obtaining a frequent item set model and multiple different time series models using historic bid request data. The system 100 includes a computing device 102 having at least one memory 104, at least one processor 106 and at least one application 108. The computing device 102 may communicate with one or more other computing devices such as computing device 110 over a network 112. The computing device 110 includes components of a typical computing device including a display 114 and other components such as a memory (not shown) and a processor (not shown).

In some implementations, the application 108 on computing device 102 receives input 116 from the computing device 110 over the network 112. The application 108 implements one or more components, as discussed in more detail below, to receive the input 116, process the input 116 and generate an output 118. The output 118 includes a forecast of a potential audience size and an unduplicated audience size. The output 118 may be visualized on the display 114 of the computing device 110.

While the implementation of FIG. 1 illustrates the input 116 being received from the computing device 110 and the output 118 being provided to the computing device 110, in other implementations, the input 116 may be received from other computing devices including being directly input into the computing device 102. Also, the output 118 may be communicated to one or more other computing devices for use and storage by those other computing devices. The output 118 also may be displayed and/or stored on the computing device 102.

The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network, such as the network 112.

The at least one processor 106 may represent two or more processors on the computing device 102 executing in parallel and utilizing corresponding instructions stored using the at least one memory 104. The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the models generated by the application 108 and its components.

The network 112 may be implemented as the Internet, but may assume other different configurations. For example, the network 112 may include a wide area network (WAN), a local area network (LAN), a wireless network, an intranet, combinations of these networks, and other networks. Of course, although the network 112 is illustrated as a single network, the network 112 may be implemented as including multiple different networks.

The application 108 may be accessed directly by a user of the computing device 102 and/or by a user of the computing device 110 accessing the application 108 over the network 112. In some implementations, the application 108 is implemented as a demand side platform (DSP). As a DSP, the application 108 receives bid requests to display ads from multiple different ad exchanges. The application 108 automatically responds to the bid requests on behalf of a customer when the bid request meets criteria established by the customer as part of a digital ad campaign. The application 108 bids in real-time auctions that are conducted by the display ad exchanges.

The application 108, including its various components discussed below, also forecasts potential audience size and unduplicated audience size, which may aid a customer conducting a digital ad campaign. In this manner, the forecasting functionality is included as part of the DSP. It is understood that other implementations of the application 108 are possible. For instance, the application 108 may be a standalone application that, along with its various components, forecast potential audience size and unduplicated audience size and provide that information to another application functioning as a DSP on the computing device 102 or another computing device.

The application 108 includes a forecast module 120 and a model creator module 122. The forecast module 120 receives the input 116. The input 116 includes an audience segment input and a time period input. The audience segment input is provided in terms of one or more attributes and values for the attributes. The attributes include country, region, browser, device, category, visibility and ad slot dimensions. The input may include more than one value for each of the attributes from a list of choices.

In more detail, the country attribute is simply the country for the audience segment. For example, the country attribute may be the United States of America, India, Fiji, etc. The region attribute is the region within the country for the target audience segment. For example, the region may be one of the states in the United States of America. Also, the region may include multiple states or all states. In other examples, the region may be one of the states or geographic areas of a country.

The browser attribute includes the type of browser being used by the audience segment. Examples of the browser attribute include Google Chrome, Safari, Opera mobile, Mozilla Firefox, and other browsers. The device attribute includes the type of device for the target audience segment. Examples of the type of device include a mobile device, a tablet device, a desktop device, or other types of devices.

The category attribute includes the type of category of the content on the webpage on which the ad slot is present. The category type may be provided by one or more of the ad exchanges or from a group of common listed categories. Some examples of the category attribute include news, sports, games, celebrity gossip, and other types of categories.

The visibility attribute includes the visibility information of the ad slot on the webpage. Examples of the visibility attribute include above the fold, below the fold or not known.

Finally, the ad slot dimension attribute may be the height and width for the dimensions of the ad slot. The ad slot dimension attribute may be measured in terms of number of pixels. Examples of the ad slot dimension attribute include 240×360, 600×800, and other types of dimensions. It is understood that other attributes may be used to define the audience segment in addition to the ones listed above.

The time period input may be specified in terms of a start date and an end date. For example, the digital campaign time may include a start date of Jan. 1, 2017 and an end date of Jan. 15, 2017. Other date formats and time periods may be used to specify the start date and the end date.

Figure 2:
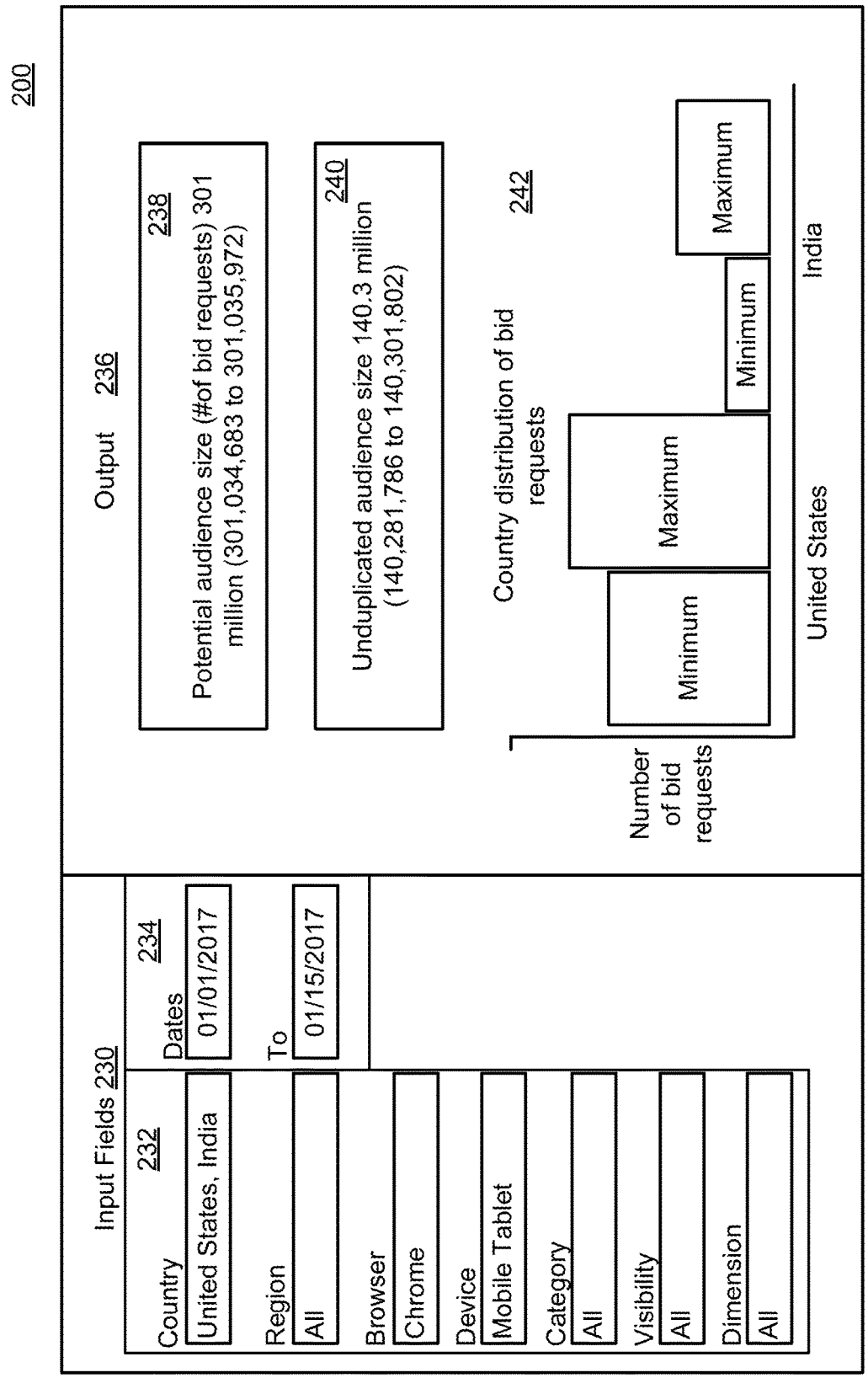
FIG. 2 is an example screen shot illustrating example input fields and output information.

Referring to FIG. 2, an example screenshot 200 illustrates example input fields 230 for the application 108. The screenshot 200 may be displayed on the display 114 of the computing device 110. Alternatively, the screenshot 200 may be displayed as part of the computing device 102 or another computing device having access to the application 108 over the network 112. The input fields 230 correspond to the input 116 of FIG. 1. In this manner, a user of the application 108 can input the audience segment and the time period.

In this example screenshot 200, there are seven attribute input fields 232 and a date input fields 234. As discussed above with respect to the input 116 of FIG. 1, the attribute input fields 232 include a country attribute, a region attribute, a browser attribute, a device attribute, a category attribute, a visibility attribute, and an ad slot dimension attribute. Each of the attribute fields 232 may be populated with one or more values. For example, the country attribute field illustrated in the screenshot 200 is populated with both the United States and India. The attribute fields 232 also may be populated with a selection of "ALL" values. For example, the region attribute field is populated with "all". Any of the attributes also can be unspecified, in which case they would include all possible values. The attribute fields 232 may use drop-down selection menus to populate values in the attribute fields. Other means may be used to populate the fields including direct text entry and selection by other means to populate the fields.

The date input field 234 provides multiple fields to enter a range of dates. The range of dates represents the digital campaign time period. While the format is illustrated as months/day/year, it is understood that other formats and inputs are possible.

Referring back to FIG. 1, the forecast module 120 receives the audience segment as part of input 116. As discussed above, the audience segment includes the attribute input fields 232 and the date input fields 234 as illustrated in the screenshot 200 of FIG. 2. The forecast module 120 converts the audience segment into multiple atomic target specifications. For example, if the country attribute input includes both India and the US and the browser attribute input includes chrome (India or US, Chrome), then the atomic target specification becomes (India, chrome) or (US, chrome). This is done for all of the selected attribute combinations that are received as the input for the target audience segment.

For example, the query received as input 116 ((Country="USA" OR Country="India") AND Browser="Chrome") is converted to ((Country="USA" AND Browser="Chrome") OR (Country=India AND Browser="Chrome")), by the forecast module 120. There is no limit to the number of ANDs and ORs that can be included as part of the atomic target specifications.

The forecast module 120 determines (or calculates) a potential audience size for each of the atomic target specifications (also referred to interchangeably as target segments). That is, for each of the mutually exclusive target segments a size prediction is done using a two-phase approach. Each of the atomic target specifications may be analyzed separately. For example, (Country="USA" AND Browser="Chrome") is calculated separately from (Country=India AND Browser="Chrome"). It is understood that while each of the atomic target specifications may be analyzed separately, the processing may be performed on each of the separate atomic target specifications in parallel.

The potential audience size is determined by the forecast module 124 using a combination of a time series model with a frequent item set model during the time period of the digital campaign time period. More specifically, the forecast module 124 determines the potential audience size by selecting a time series model based on a frequency of attribute values from the atomic target specification and combining the selected time series model with a frequent item set model. The time series model frequent item sets 124, the global time series model 126 and the frequent item set model 128 are used by the forecast module 122 to determine the potential audience size. As will be discussed in more detail below, the model creator module 122 generates the various time series models 124 and 126 and the frequent item set model 128 using the historic bid request database 130.

For each of the atomic target specifications, the forecast module 120 uses either a combination of the time series model frequent item sets 124 and the frequent item set model 128 or the global time series model 126 and the frequent item set model 128. The particular time series model selected for use by the forecast module 120 depends on whether the particular atomic target specification is a frequently occurring set of attributes as modeled from the information in the historic bid request database 130. Further, it is possible that an atomic target specification is not included in the frequent item set model 128. In such a situation, the forecast module 120 performs the prediction using the appropriate time series model and a minimum threshold number in place of the value from the frequent item set model 128.

The potential audience size may be determined for each of the atomic target specifications at different levels of granularity. In one implementation, the forecast module 120 calculates a daily audience size for each of the atomic target specifications using the combination of an appropriate time series model from the time series models 124 and 126 and the frequent item set model 128. In other implementations, other levels of granularity may be used when calculating the audience size including, for example, hourly or weekly. The particular level of granularity used may be based on a level of granularity provided as part of the historic bid request database 130 and the level of granularity used to create the time series models 124 and 126 and the frequent item set model 128, which are based on the historic bid request database 130.

Returning to more specifics regarding the potential audience size, the forecast module 120 may determine the potential audience size for each of the atomic target specifications in the following manner. The forecast module 120 checks whether the target specification includes any attribute value which occurred frequently in the historic bid request database 130. For example, when analyzing (Country="USA" AND Browser="Chrome"), the forecast module 120 determines if either (Country="USA") OR (Browser="Chrome") is historically frequent using the historic bid request database 130. If one of the attribute values is determined to be historically frequent, the forecast module 120 uses the specific time series model from the time series models frequent item sets 124 to predict the number of bid requests coming from the segment specified by the attribute value in the given time frame. If (Country="USA") is historically frequent, then it will have a specific time series model from the time series models frequent item sets 124 that is used by the forecast module 120. If (Country="USA") is not historically frequent, then it will not have a specific time series model from the time series models frequent item sets 124. The forecast module 120 performs the same check with the other attribute (Browser="Chrome"). If both attributes are historically frequent, then the forecast module 120 will select the attribute that is the most frequent that has a specific times series model from the time series models frequent item sets 124.

For example, if the (Country="USA") has been found to be more frequent than (Browser="Chrome") in the historic bid request database 130, the forecast module 120 selects the specific time series model from the time series models frequent item sets 124. The forecast module 120 uses the frequent item set model 128 to obtain a probability measure of the relative frequency of the item set defined as the target, compared to the segment specified by the attribute value used for the time series prediction. For example, the forecast module 120 calculates the conditional probability P(Browser="Chrome"|Country="USA"). The conditional probability estimate is combined with the time series estimate of expected number of bid request from Country="USA" to arrive at an estimate of bid request from (Country="USA" AND Browser="Chrome").

Going back to when the forecast module 120 checks whether the target specification includes any attribute value which occurred frequently in the historic bid request database 130, if none of the attribute values occurred frequently, then the forecast module 120 uses the global time series model 126 to predict the total number of bid requests coming from any attribute combination in the given time frame. The forecast module 120 uses the frequent item set model 128 to obtain a probability measure of the relative frequency of the item set defined as a target compared to the whole sample space. For example, the forecast module 120 calculates the unconditional probabilities such as the P(Browser="Chrome").

For the atomic target specifications which do not appear in the frequent item set model 128, the forecast module 120 provides a range of values by using a threshold value. In one implementation, the threshold value may be a configurable value that is set by a user. In other implementations, the threshold value may be a default value or a hyperparameter, which can be changed according to the resources available. Also, the forecast module 120 uses the error bounds of the relevant time series model from the time series model frequent item sets 124 along with the threshold range using the threshold value to obtain a range of predictions within a confidence range.

The forecast module 120 performs the process of checking the attribute values and calculating the probabilities for each of the atomic target specifications.

Once the forecast module 120 determines the potential audience size for each of the atomic target specifications, the forecast module 120 aggregates the potential audience size for each of the atomic target specifications over the time period input to arrive at a total potential audience size for the target audience segment over the time period input.

If the granularity level is at a daily level, the forecast module 120 determines the daily potential audience size for each of the atomic target specifications as described above. The forecast module 120 aggregates the daily potential audience size for each of the atomic target specifications into a total daily potential audience size for the audience segment for each day in the time period. Thus, the total estimated audience size is equal to the total estimated daily number of bid request from the target segment in the campaign period by summing up the estimated daily range of number of bid request for each of the components. The aggregation or summation for each of the components into the total daily number of bid request may include an error factor as well.

The forecast module 120 outputs the total potential audience size for the audience segment over the time period. The output 118 may be communicated to the computing device 110 over the network 112. The output 118 may be illustrated on the display 114 of the computing device 110. The output 118 may be visualized in various different manners including using text, charts, graphs and other visualization means.

The forecast module 120 is configured to calculate the unduplicated audience size. The forecast module 120 translates the total potential audience size to the unduplicated audience size. For example, if the total potential audience size is a daily audience size, the forecast module 120 translates the total daily audience size to the daily unduplicated audience size.

In one implementation, the forecast module 120 extracts the estimate of the unique cookies from the estimate of bid requests. The forecast module 120 may use a frequency plot of bid requests using cookies as unique user identifiers. The forecast module 120 estimates the distribution of the number bid request from each unique cookie in a fixed time window W. For example, the proportion of cookies sending exactly K bid requests (where K equals 1, 2, 3, etc.). It may be assumed that this distribution is constant across different attribute values and the forecast module 120 leverages a single relationship between the potential audience size and the unduplicated audience size. The unduplicated audience size may be expressed as a range of values.

Also, the unduplicated audience size may be calculated based on the granularity of the total audience size for the target segment. For example, if the total audience size is calculated at a daily granularity, the forecast module 120 translates the total daily audience size into a total unduplicated audience size. If the total audience size is calculated for a weekly granularity, the forecast module 120 translates the weekly total audience size to a weekly unduplicated audience size.

The model creator module 122 may create a unique cookie distribution model 132 for use by the forecast module 120 in translating the potential audience size to the unduplicated audience size. The unique cookie distribution model 132 may include both a unique day model and a unique week model. It is understood that other models based on other time periods or granularities also may be calculated.

The unique day model is a unique cookie distribution for the whole sample space over a day. The unique day is used to provide a daily level estimate for unique users. The unique week model is a unique cookie distribution for the whole sample space over a week. The unique week model is used to provide week level estimates of unique users.

The model creator module 122 calculates a single value as the adjustment ratio to obtain the unique users from the number of bid requests.

To get $u_{day}$, let f[i] denote the number of unique cookies with exactly i number of bid requests in a day (from unique day model). Thus, $$u_{day} = \frac{\sum_{i=1}^{\infty} f[i]}{\sum_{i=1}^{\infty} f[i] \times i}$$

$u_{week}$ can be obtained similarly from unique week model. The summation is calculated up to a finite value, which will be the maximum number of bid requests coming from any cookie.

Referring back to FIG. 2, the screenshot 200 illustrates an example output 236. The output includes an indication of the potential audience size 238 and the unduplicated audience size 240. In the example screenshot 200, the potential audience size, which equates to the number of bid requests equals about 301 million bid requests. The unduplicated audience size 240 equals about 140.3 million. The example illustrates an estimated number for each of the audience sizes as well as a range for the potential audience size 238 and the unduplicated audience size 240.

Further, screenshot 200 provides a graphic visualization 242 for the potential audience size for each of the countries that were part of the audience segment. In this example, the United States and India were the two countries that were part of the audience segment. The graph 242 illustrates the minimum and maximum number of bid requests for the United States and the minimum and maximum number of bid requests for India. It is understood that while screenshot 200 illustrates a graph of the country attributes that other attributes, including combinations of attributes, may be graphed or otherwise visually displayed in a graphical manner for ease of understanding by the viewer.

Figure 3:
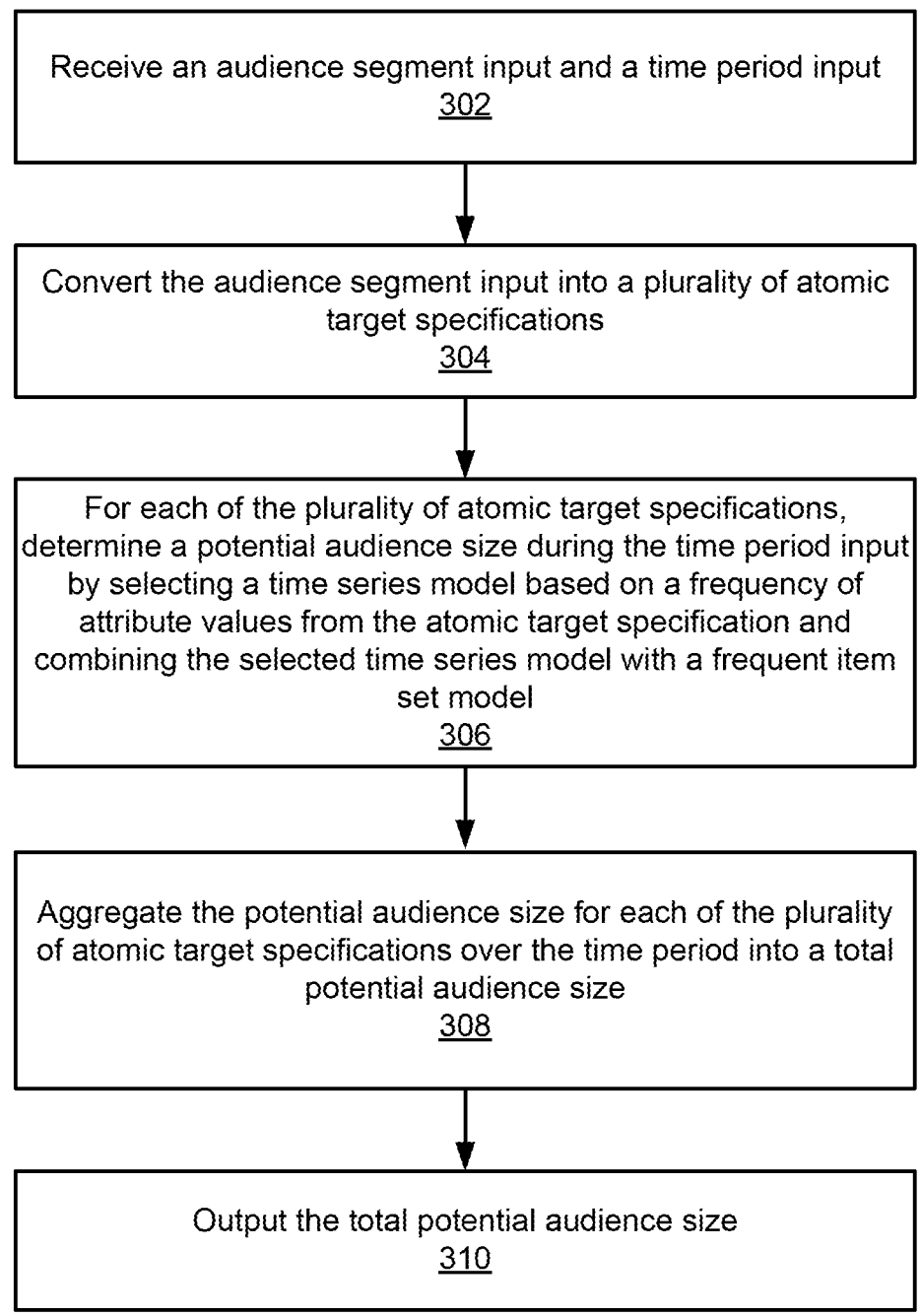
FIG. 3 is an example flowchart illustrating example operations of the system of FIG. 1.

Referring to FIG. 3, an example process 300 illustrates example operations of the system 100 of FIG. 1. Process 300 includes receiving an audience segment input and a time input (302). For example, the forecast module 120 receives input 116, where the input includes the audience segment and the time period. Examples of the audience segment and the time period are discussed in detail above and are illustrated with reference to the screenshot 200 of FIG. 2.

Process 300 includes converting the audience segment input into a plurality of atomic target specifications (304). For example, the forecast module 120 converts the audience segment received as part of the input 116 into multiple atomic target specifications. Examples of the conversion performed by the forecast module 120 are provided above with reference to the discussion above for FIG. 1.

Process 300 includes determining a potential audience size by selecting a time series model based on frequency of attribute values from the atomic target specification and combining the selected time series model with a frequent item set model for each of the atomic target specifications during the time period input (306). For example, the forecast module 120 uses the time series models frequent item sets 124, the global time series model 126 and the frequent item set model 128 to determine the potential audience size. Examples of the manner in which the forecast module uses the various models to determine the potential audience size is discussed above with respect to FIG. 1.

Additionally, FIGS. 4-6, which are described in more detail below, provide additional implementation details regarding how the forecast module 120 determines the potential audience size. Further, the model creator module 122 creates the various models 124, 126 and 128 using the historic bid request database 130. Additional details regarding the creation of the various models by the model creator module 122 are described below with reference to FIGS. 7-9.

Process 300 includes aggregating the potential audience size for each of the atomic target specifications over the time period input into a total potential audience size (308). For example, the forecast module 120, after performing the calculations to obtain the potential audience size for each of the atomic target specifications, aggregates those potential audience sizes to obtain a total potential audience size. The forecast module 120 may sum the potential audience size for each of the atomic target specifications to arrive at the total potential audience size. As discussed above, the forecast module 120 may perform this aggregation at different levels of granularity such that, for example, a total daily potential audience size or a total weekly potential audience size is obtained.

Process 300 includes outputting the total potential audience size for the audience segment over the time period (310). For example, the forecast module 120 communicates the output 118 over the network 112, where the output includes the total potential audience size for the audience segment. As discussed above, the output may be visualized on a display such as the display 114 of the computing device 110. The output 118 may take other forms as well including being output to other computing devices and/or being output for storage and later use by other applications and computing devices. The output of the total potential audience size may include a range for each granular time marker for the time period. For instance, if the time period granularity is on a daily basis, the forecast module 120 may provide a total daily potential audience size that includes a range for each day of the campaign time period. The output 118 is illustrated, as discussed above, in the example screenshot 200 of FIG. 2.

While not illustrated as part of process 300, the process may further include translating the total potential audience size to an unduplicated audience size. As discussed above, the unduplicated audience size may be included as part of the output 118 for visualization on display 114 of computing device 110.

Figure 4:
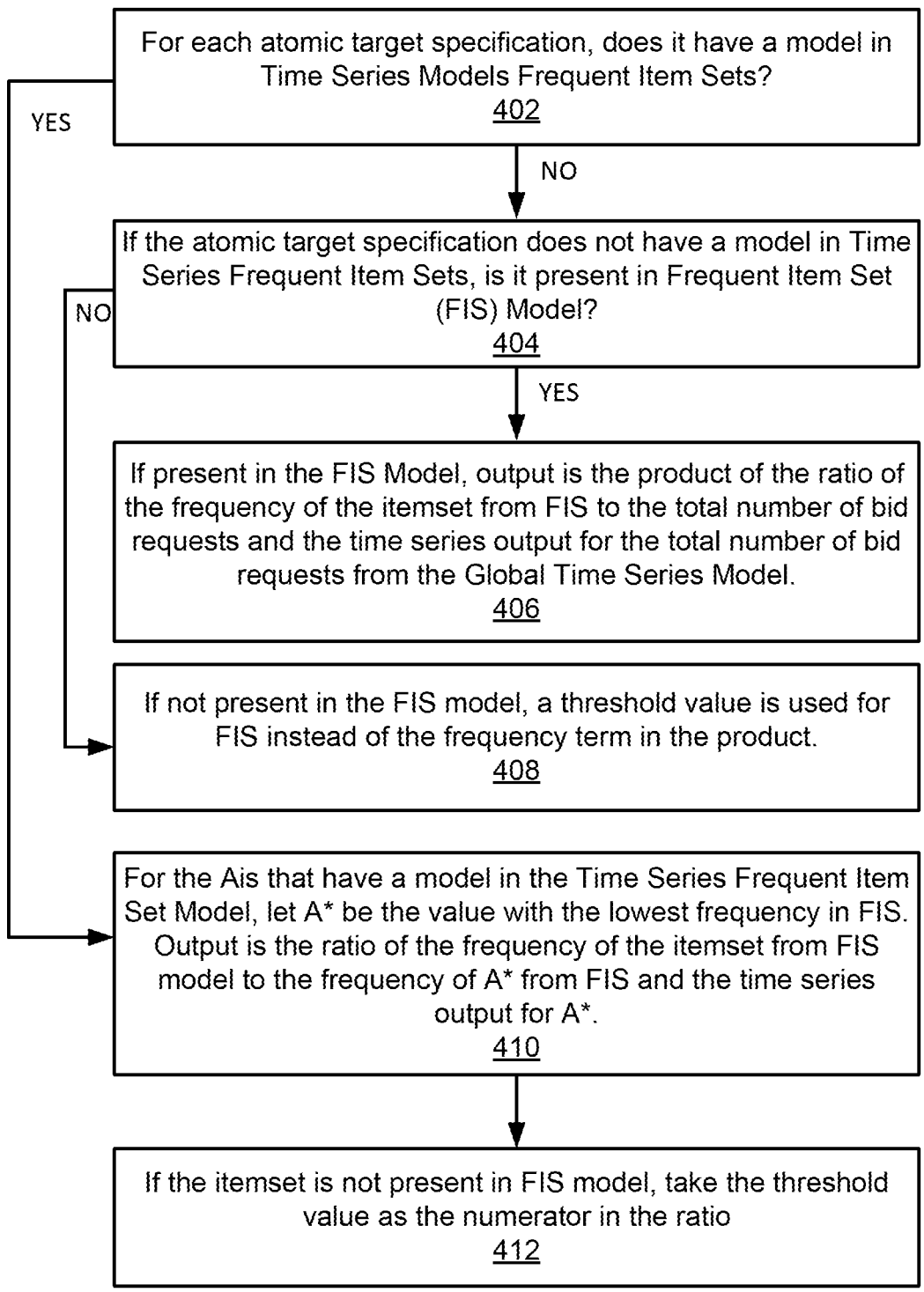
FIG. 4 is an example flowchart illustrating determining the potential audience size for each atomic target specification.

Referring to FIG. 4, an example process 400 illustrates additional details of step 306 of FIG. 3 to determine the potential audience size for each atomic target specification.

As recalled from above, the input to the process 300 of FIG. 3 is the audience segment, also referred to here as the target audience segment (T), and the time period, also referred to here as the campaign time period t. As discussed above, the target audience segment is converted into multiple atomic target specifications. For each of the atomic target specifications (in the format $(A_1, A_2, \ldots, A_f)$ where each $A_i$ is the value for the attribute i in the specification), process 400 is performed. First, for each atomic target specification, $A_i$, a query is performed to determine if the atomic target specification has a model in time series models frequent item sets 124 (402). For example, the forecast module 120 checks to see if each $A_i$ has a model in the time series model frequent item sets 124.

If the answer in step 402 is no, meaning that the atomic target specification does not have a model in the time series models frequent item sets 124, then a check is performed to see if the atomic target specification, $A_1$, is present in the frequest item set (FIS) model 128 (404). For example, the forecast module 120 determines if the atomic target specification is present in the FIS model 128.

If the current item set is present in the FIS model 128, the output is the product of the ratio the frequency of the item set from the FIS model to the total number of bid requests and the time series output for the total number of bid requests from the global time series model 126 (406). For example, the forecast module 120 calculates the output as the product of the ratio of the frequency of the item set from the FIS model 128 to the total number of bid requests and the time series output for the total number of bid requests from the global time series model 126.

If the current item set is not present in the FIS model 128, a threshold value is used for the FIS instead of the frequency term in the product (408). For example, the forecast module 120 calculates the output as in step 406, but uses a threshold value for the FIS instead of the frequency term in the product.

Going back to step 402, if the atomic target specification has a model in the time series frequent item set model, then let the A* be the value with the lowest frequency in the FIS (410). The output is the ratio of the frequency of the itemset from the FIS model 128 to the frequency of A* from FIS and the time series output for A* (410). For example, the forecast module 120 selects A* as the value with the lowest frequency in the FIS model. After setting this value, the forecast module 120 calculates the output as the ratio of the frequency of the itemset from the FIS model 128 to the frequency of A* from the FIS model 128 and the time series output for A*.

If atomic target specification is not present in the FIS model 128, then a threshold value is used in the numerator of the ratio from step 410 (412). For example, if the forecast module 120 determines that the atomic target specification is not present in the FIS model 128, the forecast module 120 uses a threshold value in the numerator of the ratio from step 410 to calculate the output. As mentioned above, process 400 is performed for each atomic target specification, as part of step 306 in FIG. 3.

Referring to FIGS. 5 and 6, example pseudocode 500 and 600 illustrate the psuedocode to obtain the range of the number of bid requests for a give input of a target audience segment over a digital campaign time period, where the range of the number of bid requests is the forecast of the potential audience size. The pseudocode 500 of FIG. 5 is the pseudocode for the process 300 of FIG. 3. The pseudocode 500 may be implemented as part of the application 108 and its components as discussed above with respect to FIGS. 1, 3 and 4. The pseudocode 600 of FIG. 6 is the pseudocode for the process 306 described in detail in FIG. 4. The pseudocode 600 may be implemented as part of the application 108 and it components as discussed above with respect to FIGS. 1, 3 and 4. In this example, the granularity of the campaign time period is daily.

Pseudocode 500 is performed as follows. As discussed above, the input is target audience segment T for a campaign time period r. The procedure is to obtain the Bid Request Estimate (T,τ). First, in line 2, the target audience segment T is converted to multiple atomic target specifications in the form of $T \equiv T_1 \lor T_2 \lor \ldots \lor T_N$, where each $T_n$ represents an atomic target segment definition (i.e., atomic target specification), i.e. any attribute in each $T_n$ has a unique value (or the value Any). Recall the input 116 from FIG. 1 as illustrated in the screenshot 200 of FIG. 2, which illustrates example values for the various target audience inputs.

Then, in lines 3-16, a daily level prediction is performed using the two phase approach using both times series models and FIS models. In the pseudocode, TIME1 is the time series models frequent items sets 124 of FIG. 1 and TIME2 is the global time series model 126 of FIG. 1. For each $T_n$, $(A_1, A_2, \ldots, A_I) \leftarrow T_n$, where $A_i$ is the (unique) value of the i th attribute for $T_n$, where in this example I=7 because there are 7 target audience attributes as possible inputs. For each $A_i$, $A_i \notin TIME1$, which checks $A_i \in TIME1$ whether there is a model for $A_i$ in TIME1, and if not, then continues. Else the psuedocode checks Feasible=Feasible∪$A_i$. Feasible checks whether or not to use a time series model from the time series models frequent items sets 124 or to use the global time series model 126.

In lines 13-14, psuedocode 600 is referenced to obtain for each day t in τ ⟨$max_n^t, min_n^t$⟩ Atomic Estimate(Feasible, $T_n$,t). Psuedocode 600 then follows the process 400 of FIG. 4 to obtain the range estimate for each atomic target specification. For example, if there is no model in the time series frequent item sets and it is present in the FIS model, then:

max←{Maximum prediction of TIME2 (within the γ % confidence range) for day t}×{(Number of bid requests for $T_n$ from FIS)/(Total number of bid requests for the training period)} and the min {Minimum prediction of TIME2 (within the γ % confidence range) for day t}×{(Number of bid requests for $T_n$ from FIS)/(Total number of bid requests for the training period)}, as shown in lines 4 and 5.

If it is not present in the FIS model 128, then max←{Maximum prediction of TIME2 (within the γ% confidence range) for day t}×{(Threshold value for FIS)/(Total number of bid requests for the training period)} and min←0 as shown in lines 7 and 8.

If the atomic target specification has a time series model in the time series models frequent item sets 124 and is present in the FIS model 128, then:

A* is the element of feasible with lowest number of bid requests (in FIS) $T_n \notin FIS$ max←{Maximum prediction of A*'s model in TIME1 (within the γ % confidence range) for day t}×{(Number of bid requests for $T_n$ from FIS)/(Number of bid requests for A* from FIS)} and min←{Minimum prediction of A*'s model in TIME1 (within the γ % confidence range) for day t}×{(Number of bid requests for $T_n$ from FIS)/(Number of bid requests for A* from FIS)}, as shown in lines 13 and 14.

If it is not present in the FIS model 128, then:
max←{Maximum prediction of A*'s model in TIME1 (within the γ % confidence range) for day t}×{(Threshold value for FIS)/(Number of bid requests for A* from FIS)} and the min←0 z,27 max,min⟩.

Referring back to pseudocode 500, in lines 18 and 19 each of the daily atomic target specifications are summed (or aggregated) to output the range of number of bid requests in the time period from the target audience segment.

$max^t = \Sigma_n max_n^t$ maximum value for day t and
$min^t = \Sigma_n min_n^t$ minimum value for day t Referring back to FIG. 1, as mentioned above, the model creator module 122 is configured to create the time series models frequent item sets 124 (also referred to as TIME1 elsewhere in this document) and the global time series model 126 (also referred to as TIME2 elsewhere in this document). The TIME1 time series models are the time series models for the most frequent attribute values. The TIME1 time series models are also used to provide estimates for the frequent item sets, as discussed above. The TIME2 time series model is a single time series for the whole sample space. The TIME2 time series model will be used to provide estimates for the infrequent item sets.

For the time series models frequent item sets 124 (TIME1), the model creator module 122 queries the historic bid request database 130 (over the whole training period) to obtain frequency values for univariate distributions, on each of the attributes. The model creator module 122 select the top k values for each of the attributes. Each of these attribute values will have a dedicated time series model in the time series models frequent item sets 124 (TIME1). Over the entire training period, the model creator module 122 obtains the daily number of bid requests having this attribute value. The model creator module 122 uses this data to train time series models in the time series models frequent item sets 124 (TIME1). In this manner, time series models are created for the feasible item sets to overcome the technical problem of the huge attribute space. Otherwise, it is infeasible to have time series models for each of the possible combinations of the attribute values.

For the global time series model 126 (TIME2), the model creator module 122 obtains the daily total number of bid requests from all over the sample space in the training period. The model creator module 122 uses this data to train the single time series model global time series model 126 (TIME2).

In one implementation, the model creator module 122 may train the time series models using the ETS module of the forecast package in R. This package searches through a class of exponential smoothing based time series fits and automatically identifies the one that has the lowest error.

In addition to the time series models, the model creator module 122 is configured to mine the historic bid request database 130 to create the frequent item set model 128. An item set refers to a possible combination of the attribute values. In this manner, the model creator module 122 mines frequent items sets where each data point is represented as a collection of categorical attributes. In the examples provided above, the categorical attributes include those relevant for the potential audience forecast. For example, India, Chrome and Mobile specifies an item set, in which the unspecified attributes can take any value. The model creator module 122 finds the item sets in the historic bid request database that are frequent and that satisfy additional constraints.

These constraints appear naturally in datasets. For instance, in the bid requests data, each bid request contains at most one value for each of the attributes. There is only one country in a bid request such that "India" and "USA" cannot appear together, since a bid request can only come from a particular country. Similarly, a bid request can have only one value for the browser or device attributes. Hence, the model creator module 122 uses these characteristics of the data call to improve the mining of the historic bid request database 130 over the traditional algorithms by incorporating knowledge of this additional information.

As a general overview, the model creator module 122 uses as input the set of transactions from the historic bid request database 130, a minimum threshold and a number of interesting attributes (n). The minimum threshold may be set by default or may be input by a user. The model creator module 122 creates a set of candidate item sets, C1. The candidate item sets contain only one item each. The set C1 contains a set corresponding to all the values which each of the attributes can take. For example, C1 may be bid requests where Country=USA, bid requests where Country=India, bid requests where Browser=Chrome and bid requests where Browser=Firefox.

Initially, the model creator module 122 checks all the items sets in C1 against the minimum threshold criteria. The items sets in C1 that meet the minimum threshold criteria are created as a subset, F1, of C1. In this manner, on the initial pass, the model creator module 122 eliminates those item sets of C1 that do not meet the minimum threshold criteria.

Once the subset of item sets F1 is created, the model creator module 122 performs an iterative process to arrive at the output, which is the frequent item set model 124. From the subset of items sets F1, the model creator module 122 creates candidate item sets, Ck, ensuring that categorical constraints are satisfied by applying the idea that if a set is rare, then its subsets are also rare. In the first iterative pass, Ck includes the item sets having two attributes. The model creator module 122 applies the minimum threshold to all the item sets in Ck to create a subset of Ck, Fk. The model creator module 122 repeats this iterative process for all k greater than 1 and less than or equal to n, which is the number of interesting attributes that was included as part of the input. For example, the model creator module 122 leverages that idea that if bid requests where Country=Fiji is not in F1, then the model creator module 122 does not consider bid requests where Country=Fiji AND Browser=Chrome in subset C2.

In general, the iterative process steps for the model creator module 122 include finding the candidate sets at level k. The model creator module 122 check the categorical constraints meaning that if an attribute is not frequent than item sets having that attribute are not frequent. The model creator module 122 checks the minimum threshold and finds the frequent item sets at level k. Then, the model creator module 122 advances to the next level (i.e., k=k+1) and repeats the same iterative process.

The model creator module 122 outputs set of Fi or all "i" from 1 to n along with the frequency of each item set and creates the frequent item set model 128 with this output, where the frequent item set model 128 is used as described above with respect to FIGS. 1 and 3.

The model creator module 122 also can estimate the infrequent items sets that were eliminated as part of the model creation by using the idea that the frequency of an item set (e.g., A and B) is upper bounded by the minimum frequency of A and the minimum frequency of B, where A and B are any two item sets.

Below is a more detailed description of the operation of the model creator module 122 to obtain the frequent item set model 128. Assume n is the number of attributes in a transaction. The $i^{th}$ attribute by $A_i$ and the corresponding set of values which this attribute can take as $\Omega_i$, for all i from 1 to n. For $i^{th}$ attribute, let these values be $a_{i1}, a_{i2}, \ldots, a_{il_i}$. Another value Any is added to $\Omega_i \forall i$ to account for all the cases where this attribute is unspecified in a transaction. Let this value be $a_{i0}$.

Hence, $$\Omega_i = \{a_{i0}, a_{i1}, a_{i2}, \ldots, a_{il_i}\},$$

$\forall i$, such that $1 \leq i \leq n$ and $|\Omega_i| = l_i + 1$. Hence, all possible itemsets which satisfy categorical attribute-based constraints belong to a set $\Omega$ where $$\Omega = \Omega_1 \times \Omega_2 \ldots \times \Omega_n,$$

An itemset satisfying categorical constraints is denoted as $I_k$, where $I_k \in \Omega$ and exactly k items in $I_k$ are not equal to Any. The number of itemsets in $\Omega$ is extremely high for datasets discussed before, entailing a frequent itemset mining approach performed by the model creator module 128.

As discussed above, the model creator module 128 uses an iterative approach. The iterative aspects are discussed in more detail below. First, the model creator module 128 creates the initial item sets. There are two sets of items for every iteration of the algorithm. The candidate item sets are the ones which follow the categorical constraints but are not yet checked for minimum support condition for that iteration (more on this later). Frequent item sets are the ones which are frequent and satisfy the categorical constraints as well.

For the k th iteration (or a pass), the item sets having exactly k items not equal to Any are considered. Clearly, for n attributes, there are $$\binom{n}{k}$$

possible combinations of attributes. Hence, different dictionaries are maintained for each of these combinations, using itemsets as keys and their frequencies as values. Therefore, the set of candidate and frequent item sets at pass k are given as follows—

$$P^k = \{P_1^k, P_2^k, \ldots, P_{n_k}^k\},$$

$$Q^k = \{Q_1^k, Q_2^k, \ldots, Q_{n_k}^k\},$$

where $P_i^k$ & $Q_i^k$ are dictionaries having candidate and frequent item sets as keys with their frequencies as values at pass k respectively, corresponding to $i^{th}$ combination, $\forall i$ such that $$1 \le i \le \binom{n}{k}.$$

Consider an example to illustrate above notations. Take n=3 and k=2. Hence, we are looking at 3 attributes in total and $2^{nd}$ iteration of the algorithm. There are $$\binom{3}{2} = 3$$

possible combinations of attributes. Let the three attributes be Country, Browser and Device. The three combinations are (Country,Browser), (Country,Device) and (Browser,Device).

Hence, $P_1^2$ will store all candidate itemsets that have Country and Browser specified and Device as Any. Similarly, $P_2^2$ will store all candidate itemsets that have Country and Device specified and Browser as Any and so on.

The model creator module 128 uses the following ideas when obtaining the frequent item set model 128. First, if a set is infrequent, then its supersets are also infrequent. Using this property, the candidate item sets are created at pass k, using only the frequent item sets at pass k–1. Here, superset of a set refers to a finer specification, which is subsumed by the original set.

For instance, in terms of number of bid requests, in a particular time frame, if there are very few bid requests from a country like Fiji, there will be less number of requests from the country Fiji, where the browser used is Chrome.

Second, for any two sets A and B, Pr(A∩B)≤min(Pr(A), Pr(B)). This idea helps to prune out the infrequent item sets and give corresponding upper bounds.

Using the same example as above, the number of bid requests coming from country Fiji and browser as Chrome, is upper bounded by the minimum of number of bid requests coming from Fiji and the number of bid requests having browser as Chrome.

The model creator module 120, as discussed above, uses three inputs to mine the historic bid request database 130 to obtain the frequent item set model 128.

1. The minimum threshold δ—This threshold is applicable for all item sets, regardless of what number of items take the value Any.

2. The n attributes in a transaction—

$$A = \{A_1, A_2, \ldots, A_n\} \text{ and}$$

3. the dataset B containing m transactions—

$$B = \{B_1, B_2, \ldots, B_m\},$$

where $B_i = (a_1, a_2, \ldots, a_n)_i$, $a_j$ corresponds to the $j^{th}$ attribute $A_j$.

The model creator module 120 outputs the set of all frequent item sets which satisfy the categorical constraints, along with their frequency. The output set O can be summarized as follows:

$$O = \left\{(I, f) \mid I \in Q_j^i \text{ for } 1 \le i \le n \text{ and } 1 \le j \le \binom{n}{i}\right\},$$

f is the frequency of I in B}

Referring to FIG. 7, example pseudocode 700 may be executed by the model creator module 122 to obtain the frequent item set model 128 from the historic bid request database 130. The pseudocode is annotated with notes to explain the code and the process steps being performed.

Referring also to FIGS. 8 and 9, example pseudocode 800 and example pseudocode 900 illustrate code subroutines referenced in the pseudocode 700 of FIG. 7. Pseudocode 800 performs a generator function for candidate sets and pseudocode 900 performs a generator function for combination lists.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for forecasting a potential audience size and an unduplicated audience size for a digital campaign including executing instructions stored on a non-transitory computer-readable storage medium, the method comprising:
   receiving historic bid request data from a plurality of ad exchanges at a demand side platform (DSP);
   generating a plurality of time series models and a frequent itemset model based on the historic bid request data, wherein the frequent item set model is generated by iteratively applying a minimum threshold to attributes in a dataset and eliminating item sets that do not meet the minimum threshold;
   receiving an audience segment input and a time period input, wherein the audience segment input comprises an OR clause;
   converting the audience segment input into a plurality of atomic target specifications by splitting the audience segment input based on the OR clause;
   for each of the plurality of atomic target specifications, determining a potential audience size during the time period input by:
      selecting a time series model from the plurality of time series models based on a frequency of attribute values from the corresponding atomic target specification,
      computing a conditional probability of the atomic target specification relative to a frequency of a segment corresponding to the time series model, and
      combining the selected time series model with the frequent item set model based on the conditional probability;
   aggregating the potential audience size for each of the plurality of atomic target specifications over the time period input into a total potential audience size;
   translating the total potential audience size to an unduplicated audience size by estimating a distribution of bid requests from unique cookies over a fixed time period in relation to the total potential audience size; and
   automatically responding to bid requests from the ad exchanges in real time using the DSP based at least in part on the total potential audience size and the unduplicated audience size.

2. The method as in claim 1, wherein the total potential audience size for the audience segment input comprises a range for each day of the time period input.

3. The method as in claim 1, wherein determining the potential audience size for each of the plurality of atomic target specifications comprises:
   determining whether the atomic target specification matches one of a plurality of time series models for frequent attribute values;
   responsive to matching the atomic target specification to one of the plurality of time series models for frequent attribute values, determining the potential audience size for the atomic target specification by selecting the matching time series model and combining the selected matching time series model with the frequent item set model; and
   responsive to not matching the atomic target specification to one of the plurality of time series models for frequent attribute values, determining the potential audience size for the atomic target specification by selecting a global time series model and combining the selected global time series model with the frequent item set model.

4. The method as in claim 3, further comprising obtaining the plurality of time series models for frequent attribute values by performing queries against an historic bid request database to obtain frequency values for each of the attributes, selecting a top number of values for each of the attributes and creating a time series model for each of the selected top number of values for each of the attributes.

5. The method as in claim 3, further comprising obtaining the global time series model by using a total number of bid requests from an historic bid request database over a training period.

6. The method as in claim 1, further comprising obtaining the frequent item set model by mining an historic bid request database for frequent item sets against minimum threshold criteria under categorical constraints.

7. A system for forecasting a potential audience size and an unduplicated audience size for a digital campaign, the system comprising:
   at least one memory including instructions; and
   at least one processor that is operably coupled to the at least one memory and that is arranged and configured to execute the instructions that, when executed, cause the at least one processor to implement a forecast module that is configured to:
      receive historic bid request data from a plurality of ad exchanges at a demand side platform (DSP);
      generate a plurality of time series models and a frequent itemset model based on the historic bid request data, wherein the frequent item set model is generated by iteratively applying a minimum threshold to attributes in a dataset and eliminating item sets that do not meet the minimum threshold;

receive an audience segment input and a time period input, wherein the audience segment input comprises an OR clause;
convert the audience segment input into a plurality of atomic target specifications by splitting the audience segment input based on the OR clause;
for each of the plurality of atomic target specifications, determine a potential audience size during the time period input by:
　selecting a time series model from the plurality of time series models based on a frequency of attribute values from the corresponding atomic target specification,
　computing a conditional probability of the atomic target specification relative to a frequency of a segment corresponding to the time series model, and
　combining the selected time series model with the frequent item set model based on the conditional probability;
aggregate the potential audience size for each of the plurality of atomic target specifications over the time period input into a total potential audience size;
translate the total potential audience size to an unduplicated audience size by estimating a distribution of bid requests from unique cookies over a fixed time period in relation to the total potential audience size; and
automatically respond to bid requests from the ad exchanges in real time using the DSP based at least in part on the total potential audience size and the unduplicated audience size.

8. The system of claim 7, wherein the total potential audience size for the audience segment input comprises a range for each day of the time period input.

9. The system of claim 7, wherein the forecast module is configured to determine the potential audience size for each of the plurality of atomic target specifications by:
　determining whether the atomic target specification matches one of a plurality of time series models for frequent attribute values;
　responsive to matching the atomic target specification to one of the plurality of time series models for frequent attribute values, determining the potential audience size for the atomic target specification by selecting the matching time series model and combining the selected matching time series model with the frequent item set model; and
　responsive to not matching the atomic target specification to one of the plurality of time series models for frequent attribute values, determining the potential audience size for the atomic target specification by selecting a global time series model and combining the selected global time series model with the frequent item set model.

10. The system of claim 9, wherein the instructions that, when executed, further cause the at least one processor to implement a model creator module that is configured to:
　obtain the plurality of time series models for frequent attribute values by performing queries against an historic bid request database to obtain frequency values for each of the attributes;
　select a top number of values for each of the attributes; and
　create a time series model for each of the selected top number of values for each of the attributes.

11. The system of claim 9, wherein the model creator module is further configured to obtain the global time series model by using a total number of bid requests from an historic bid request database over a training period.

12. The system of claim 7, wherein the instructions that, when executed, further cause the at least one processor to implement a model creator module that is configured to obtain the frequent item set model by mining an historic bid request database for frequent item sets against minimum threshold criteria under categorical constraints.

13. A computer program product for forecasting a potential audience size and an unduplicated audience size for a digital campaign, the computer program product being tangibly embodied on a non-transitory computer-readable storage medium and comprising instructions that, when executed by at least one computing device, are configured to cause the at least one computing device to:
　receive a minimum threshold, a number of attributes in a transaction and a dataset including historic bid request data from a plurality of ad exchanges at a demand side platform (DSP);
　create a frequent item set model by iteratively applying the minimum threshold to the number of attributes in the dataset and eliminating item sets that do not meet the minimum threshold;
　receiving an audience segment input and a time period input, wherein the audience segment input comprises an OR clause;
　converting the audience segment input into a plurality of atomic target specifications by splitting the audience segment input based on the OR clause;
　for each of the plurality of atomic target specifications, determine a potential audience size during the time period input by:
　　selecting a time series model based on a frequency of attribute values from the corresponding atomic target specification,
　　computing a conditional probability of the atomic target specification relative to a frequency of a segment corresponding to the time series model, and
　　combining the selected time series model with a frequent item set model based on the conditional probability;
　aggregate the potential audience size for each of the plurality of atomic target specifications over the time period input into a total potential audience size;
　translate the total potential audience size to an unduplicated audience size by estimating a distribution of bid requests from unique cookies over a fixed time period in relation to the total potential audience size; and
　automatically respond to bid requests from the ad exchanges in real time using the DSP based at least in part on the total potential audience size and the unduplicated audience size.

14. The computer program product of claim 13, wherein the instructions that, when executed, cause the computing device to determine the potential audience size include instructions that, when executed, cause the computing device to:
　determine whether the atomic target specification matches one of a plurality of time series models for frequent attribute values;
　responsive to matching the atomic target specification to one of the plurality of time series models for frequent attribute values, determine the potential audience size for the atomic target specification by selecting the matching time series model and combining the selected matching time series model with the frequent item set model; and responsive to not matching the atomic target specification to one of the plurality of time series models for frequent attribute values, determine the potential audience size for the atomic target specification by selecting a global time series model and combining the selected global time series model with the frequent item set model.

* * * * *